United States Patent [19]

Stave et al.

[11] 4,138,703

[45] Feb. 6, 1979

[54] VIDEO DISC PACKAGE

[75] Inventors: Frederick R. Stave; Leslie A. Torrington, both of Indianapolis, Ind.

[73] Assignee: RCA Corporation, New York, N.Y.

[21] Appl. No.: 821,200

[22] Filed: Aug. 2, 1977

[51] Int. Cl.² .................. G11B 5/82; G11B 17/00; G11B 25/04; B65D 85/02

[52] U.S. Cl. .................. 360/133; 206/309; 206/244; 310/10; 360/97; 360/135

[58] Field of Search .............. 360/133, 135, 97–99, 360/86, 137; 206/444, 312, 309

[56] References Cited

U.S. PATENT DOCUMENTS

| 3,662,360 | 5/1972 | Lambert | 360/133 |
|---|---|---|---|
| 3,836,731 | 9/1974 | Wilisch et al. | 360/86 |
| 3,940,147 | 2/1976 | Hunt et al. | 360/86 |
| 3,951,264 | 4/1976 | Heidecker et al. | 360/135 |
| 3,959,823 | 5/1976 | Heidecker et al. | 360/133 |

*Primary Examiner*—Alfred H. Eddleman

*Attorney, Agent, or Firm*—Eugene M. Whitacre; Joseph S. Tripoli; Dilip A. Kulkarni

[57] ABSTRACT

A video disc package includes a jacket having a record enclosing cavity and an end access opening in communication therewith. A record retaining member, comprising a spine and an annular element, is reciprocably mounted within the cavity. The spine portion forms a closure for the jacket when the retaining member is fully inserted therein. The annular element has a through opening for receiving a record. An edge of the spine portion remains exposed upon full insertion of the spine into the jacket. Indicia are secured to the exposed edge of the spine for associating a given side of the spine with the first side of an enclosed record and the other side of the spine with the second side of the enclosed record. The record is enclosed within the package such that its first side is adjacent to the given side of the spine and its second side is contiguous to the other side of the spine.

8 Claims, 9 Drawing Figures

VIDEO DISC PACKAGE

The present invention generally relates to video disc systems. More particularly, this invention relates to a novel record side identification system for a video disc package.

In systems involving high density information records, such as video discs, it has been found desirable to provide a package/player combination wherein a disc record is inserted into, and removed from, the player while it remains enclosed in its protective package. For example, a package interface apparatus for a video disc player is described in the U.S. patent application, Ser. No. 801,604, of L. A. Torrington, which was filed on May 31, 1977. Additionally, reference may be made to the U.S. patent application, Ser. No. 801,603, also of L. A. Torrington and filed on May 31, 1977, for an advantageous package suitable for use with such automatic record insertion/extraction system.

As described in the aforementioned applications, the novel package includes a jacket having a record enclosing cavity and an edge opening in communication therewith. A record retaining member, comprising a spine and an annular portion, is reciprocably mounted within the jacket. The spine forms a closure for the jacket when the record retaining member is completely inserted therein. The annular portion has a through opening for receiving a record. An edge of the spine remains exposed upon full insertion of the spine into the jacket.

When an occupied jacket is fully inserted into a record player, a record extracting means disposed in the player engages the spine portion of the record retaining member. Such an engagement precludes a removal of the record retaining member from the player during jacket withdrawal subsequent to an occupied jacket arrival at the fully inserted position in the player, thereby causing retention of an enclosed record in the player. A platform mounted in the player supports a retained record when it is disposed in a raised position. The platform is thereafter depressed to transfer the retained record from the platform to the turntable for playback.

When an empty jacket is inserted into the player after playback, the platform, carrying the record retaining member and the retained record, is raised to cause the reversion of the record retaining member and the retained record into the empty jacket during jacket insertion. Subsequent withdrawal of the jacket from the player retrieves the record retaining member and the enclosed record therewith.

In such systems, where the record player is supplied with covered discs, it is desirable that the record package be provided with convenient means for identifying the two sides of the enclosed record.

In order to provide record side identification, one may employ a jacket which is transparent or has a window adjacent to the label area of an enclosed labeled record. A transparent jacket is undesirable because it does not permit use of lower-priced plastic materials. A windowed jacket is undesirable because it allows dust and debris to enter into the record enclosing cavity.

Pursuant to the principles of the present invention, indicia are secured to the exposed edge of the spine for associating a given side of the spine with the first side of a record and the other side of the spine with the second side of the record. A record is enclosed within the package such that its first side is next to the given side of the spine and its second side is near the other side of the spine.

In accordance with another embodiment of the present invention, cutouts are provided on the opposing sides of the jacket through which respective portions of the spine are exposed when the spine is fully retrieved into the jacket. Indicia are secured to the exposed portions of the spine for associating a given side of the spine with the first side of a record and the other side of the spine with the second side of the record. A record is enclosed within the package such that its first side is adjacent to the given side of the spine and its second side is contiguous to the other side of the spine.

Since the orientation of the record with respect to the record retaining member is constant, securing of the record side identifying indicia to the spine portion provides a unique system for identifying the record sides independent of how a record is retrieved into its jacket.

Several advantages flow from applicants' novel system. In retrieving the record from the player, the user is freed from the inconvenience of inserting an empty jacket in a certain manner to obtain a given orientation of the enclosed record relative to the jacket, since the applicants' system works independent of the orientation of the record relative to the jacket. Furthermore, since the applicants' system removes the need for a transparent jacket, lower priced impact resistant plastic materials can be used for the jacket. Having now cleared the way for an opaque jacket the need for labeling the discs for consumer purposes is eliminated.

Figure 2:
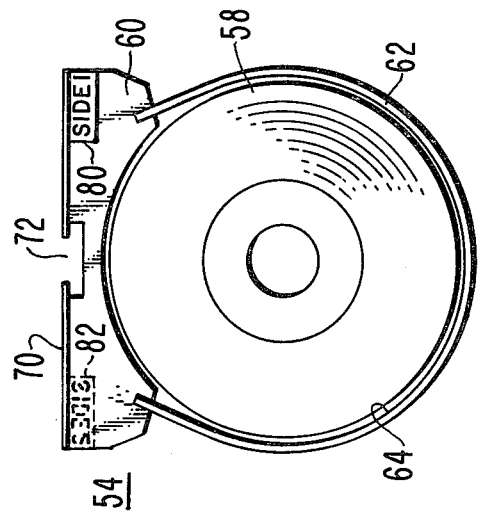
FIG. 2 shows the top view of the record retaining member of FIG. 1.
Figure 3:
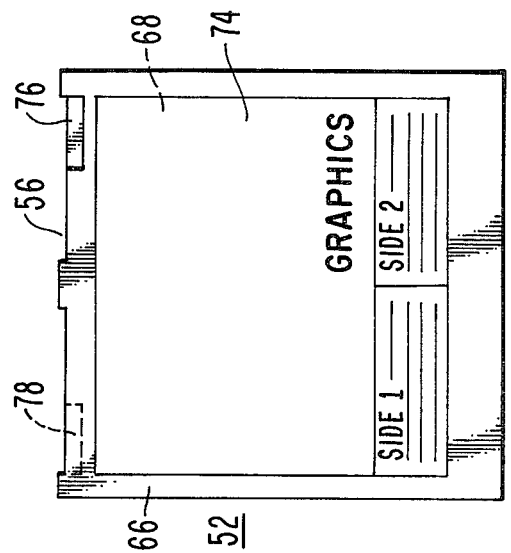
FIG. 3 depicts the top view of the jacket of FIG. 1.
Figure 1:
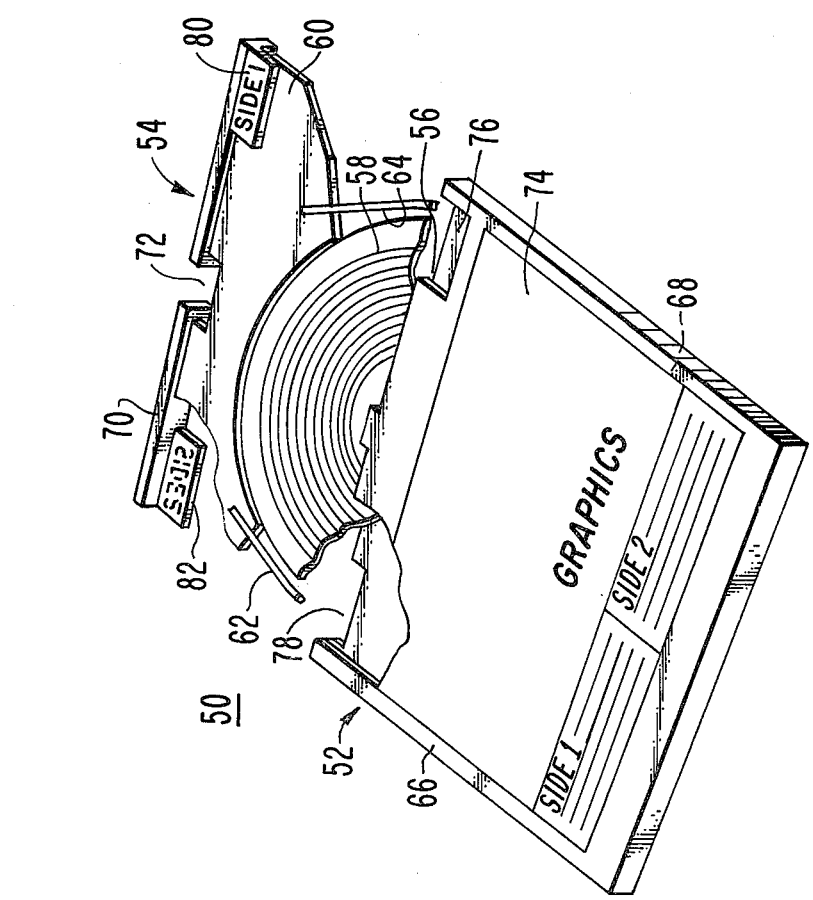
FIG. 1 illustrates a perspective view of a record package embodying the concepts of the present invention; the novel record package comprising a jacket and a record retaining member slidably mounted therewithin.

FIG. 1 is a perspective exploded view of a record protective cover 50 suitable for use with a video disc system described subsequently. As shown therein, the record cover comprises a sleeve-type jacket 52 and a record retaining tray 54. FIGS. 2 and 3 show, respectively, the top views of the tray and the jacket of FIG. 1. The jacket 52 has an end access opening 56 having dimensions permitting the tray 54, carrying a video disc 58, to slide freely therethrough.

The thickness of the tray 54 is about the same as the thickness of the video disc 58. As shown more clearly in FIG. 2, the tray 54 is comprised of a spine portion 60 and an annular portion 62 formed by a looped wire having its ends secured to the spine portion. The inner walls of the looped wire define an opening 64 having a diameter slightly greater than the diameter of the video disc 58. The tray 54 allows access to both faces of the video disc 58 without requiring any alteration of the position of the video disc within the tray or the jacket 52. Both the tray 54 and the video disc 58 are supported within the jacket 52 by the interior surfaces of the jacket forming panels 66 and 68 as shown in FIG. 1.

When the tray 54 is fully inserted into the jacket 52, a front portion 70 of the spine 60 extends into the access opening 56 and closes it to keep dust or other contaminants from entering into the record enclosing cavity of the jacket.

The front portion 70 of the spine 60 has a record extracting member receiving hole 72 which is accessible in a direction substantially parallel to the direction of the to-and-fro movement of the tray 54 in the jacket 52.

The tray 54 includes detents which are received in the depressions provided in the jacket 52 when the tray is fully inserted into the jacket. The detents prevent inadvertent slippage of an enclosed video disc from the jacket.

As shown in FIGS. 1 and 3, artwork 74 is secured to the opposing sides of the jacket 52. The artwork 74 includes graphics as well as information regarding the contents of the two sides of the video disc 58.

The opposing panels 66 and 68 of the jacket 52 have cutouts 76 and 78 in which blocks 80 and 82, secured to the spine portion 60, are snugly received when the record retaining member 54 is completely inserted into the jacket. The blocks 80 and 82 carry record side identification indicia in the manner shown in FIGS. 1 and 2. The relative dispositions of the cutouts 76 and 78 on the opposing panels 66 and 68 of the jacket 52 are such that each one of the two cutouts is capable of receiving either one of the two indicia carrying blocks 80 and 82 depending upon the orientation of the jacket relative to the record retaining member 54. An advantage of such disposition of the cutouts is that identical panels can be used to construct the jacket.

The video disc 58 is enclosed in the package 50 such that its side one is contiguous to the side of the spine 60 having indicia indicating "SIDE 1" and the side two of the video disc is adjacent to the side of the spine having indicia indicating "SIDE 2."

Figure 4:
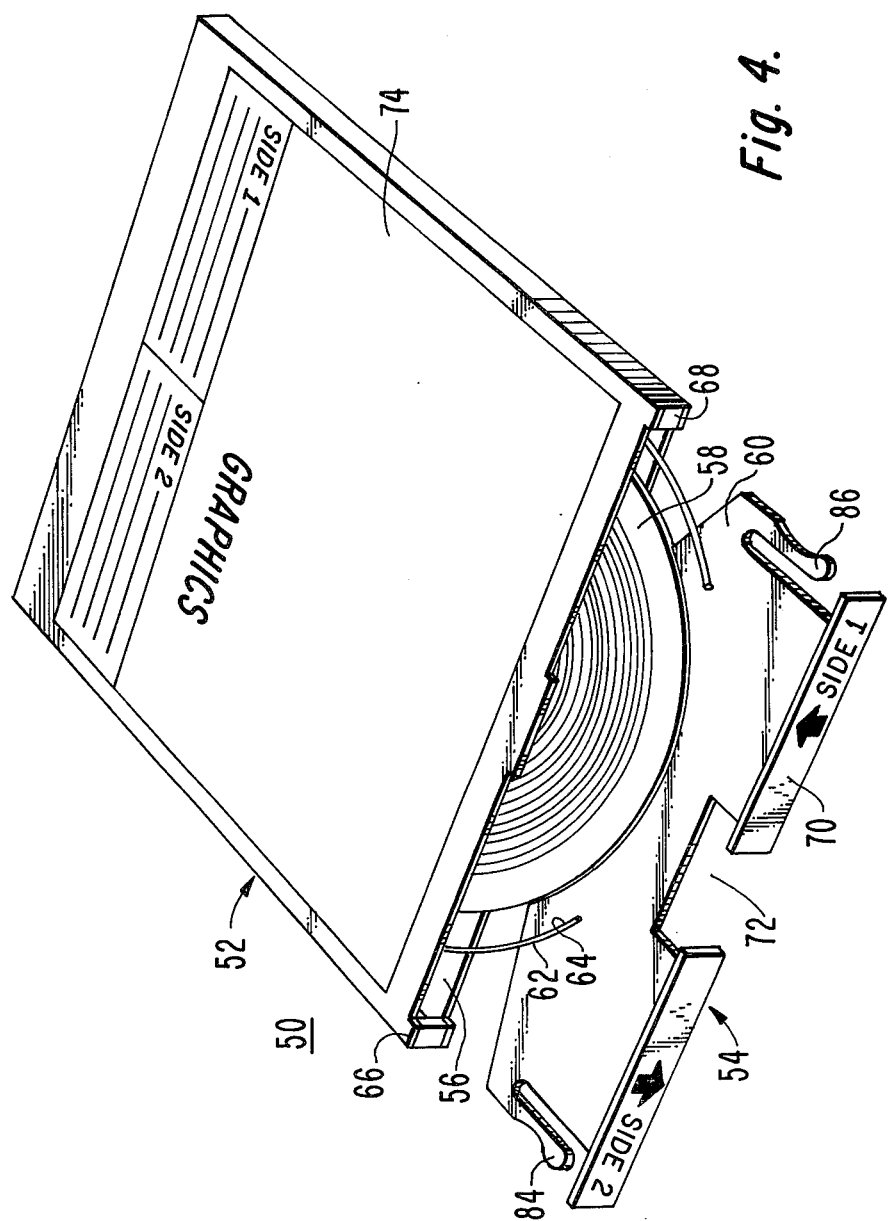
FIG. 4 illustrates a perspective view of a record package in accordance with another embodiment of the present invention.

FIG. 4 shows another embodiment of a record package pursuant to the present invention. In the embodiment of FIG. 4, the record side identifying indicia is secured to the exposed edge of the front portion 70 of the spine 60 as shown. As shown therein, the spine portion 60 includes detents 84 and 86 which are received in depression (not shown) provided in the jacket 52 when the record retaining tray 54 is fully inserted into the jacket.

Figure 5:
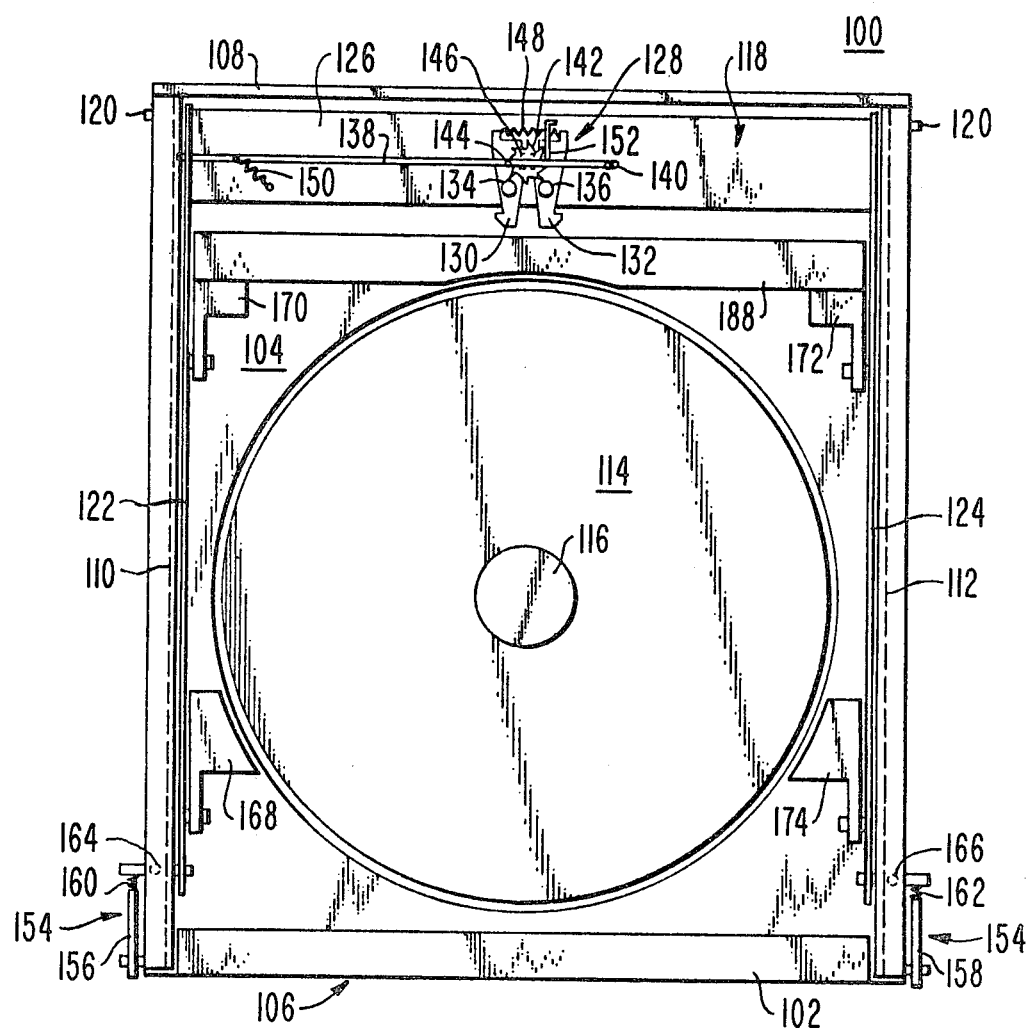
FIG. 5 represents a video disc player suitable for use with the record packages of FIGS. 1-4.
Figure 6:
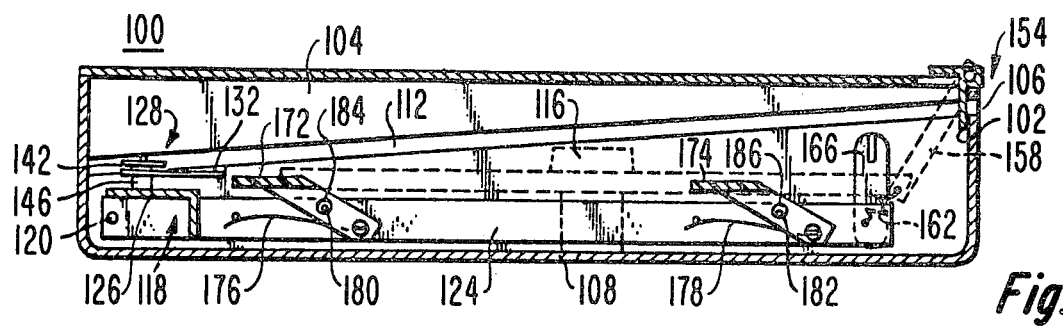
FIGS. 6 and 7 illustrate the end views of the video player of FIG. 5, where a record supporting platform is shown, respectively, in an elevated position and a depressed position.
Figure 7:
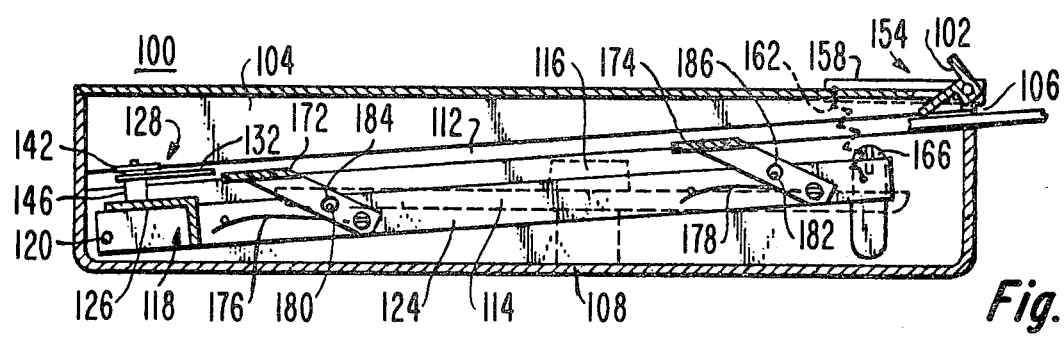

FIG. 5 is a plan view of a video disc player 100 which includes a package interface apparatus. The player is shown with its lid removed for exposing underlying details. FIGS. 6 and 7 are sectional views of the video disc player of FIG. 5 along the center line thereof while a dust excluding flap 102 is disposed, respectively, in a closed position and an open position.

The player has a pollution free chamber 104 into which the record cover 50 is inserted through an input slot 106. The input slot 106 has dimensions which permit the record cover to slide therethrough without hindrance. The dust excluding flap 102 is pivotally mounted to the player housing 108 for motion between the closed position denying access to the chamber 104 (FIG. 6), and the open position permitting access to the chamber (FIG. 7). The flap 102 serves to keep the chamber 104 from being contaminated by dust or other foreign matter.

The player housing 108 is provided with a pair of channels 110 and 112 for guiding the insertion and removal of the record cover into and from the player. The channels 110 and 112 are disposed at an angle relative to the player housing 108 such that they are aligned with the input slot 106 at the front end of the player.

The video disc player further includes a turntable 114 for rotatably supporting a video disc during playback. The turntable 114 has a central spindle 116 subject to reception in the centering aperture of the video disc. A stylus arm carriage carrying a signal pickup device is not shown for the sake of clarity. The stylus arm carriage traverses the signal pickup across a turntable mounted video disc during playback.

A platform 118 is pivotally mounted about a rod 120 for motion between a depressed position (FIG. 6) and an elevated position (FIG. 7). The platform 118 comprises a pair of side rails 122 and 124 joined by a cross member 126 at the rear end of the player 100.

Figure 8:
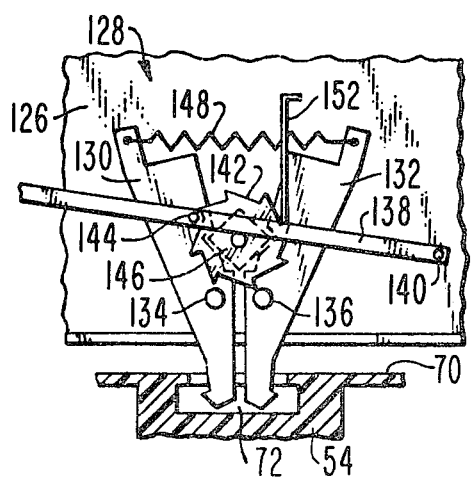
FIGS. 8 and 9 show a record extracting mechanism suitable for use with the video disc player of FIGS. 5-7; wherein latch arms are illustrated, respectively, in a withdrawn and an extended position.
Figure 9:
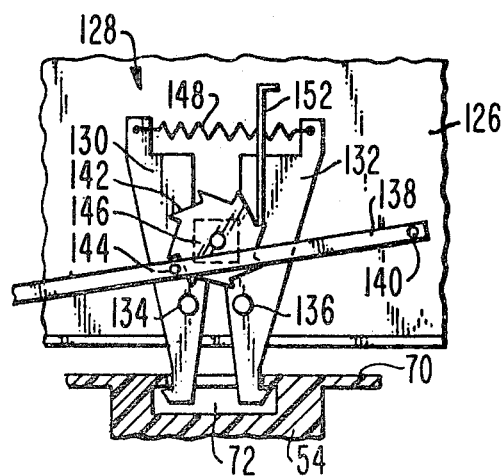

As shown in FIGS. 5, 8 and 9, a record extracting mechanism 128, having a pair of latch arms 130 and 132 which are pivoted around pins 134 and 136, is mounted at the rear end of the player 100 on the cross member 126. As can be seen from FIG. 7, the latch arms 130 and 132 are aligned with the center line of the channels 110 and 112 when the platform 118 is occupying the elevated position. The latch arms 130 and 132 are admitted into the hole 72 provided in the tray 54 when the record cover 50 is fully inserted into the player 100.

The record extracting mechanism 128 includes a paddle arm 138 pivoted about a pin 140 mounted on the cross member 126. The paddle arm 138 is rotated clockwise through an arc when the record cover is fully inserted into the player. The clockwise rotation of the paddle arm 138 causes a ratchet wheel 142, rotatably mounted on the cross member 126, to advance by one tooth, also in a clockwise direction, via a retractable pin 144 mounted on the paddle arm. Such rotation of the ratchet wheel 142 causes a square-shaped cam 146, disposed between the latch arms 130 and 132 and secured to the ratchet wheel, to advance by one step (e.g., 45°) in a clockwise direction. Such advancement of the square-shaped cam 146 causes the latch arms 130 and 132 to alternate between an extended condition (FIG. 9) and a retracted condition (FIG. 8). A spring 148 interconnects the rear ends of the latch arms 130 and 132 in order to assure continuous engagement between the latch arms and the cam 146.

When the record cover is withdrawn from the player 100, a spring 150 causes the paddle arm 138 to return to its home position shown in FIGS. 5 and 9. The record extracting mechanism 128 includes a pawl 152 for preventing a reversal of the motion of the ratchet wheel 142 as the paddle arm 138 returns to its home position. It can be seen from FIGS. 5, 8 and 9, that although the pawl 152 prevents a motion of the ratchet wheel 142 in the reverse (anti-clockwise) direction, it allows the forward motion (clockwise) of the ratchet wheel. The pin 144 is made retractable in order to allow the paddle arm 138 to return to its home position without requiring the ratchet wheel 142 to rotate in the reverse direction.

Thus, each time the record cover is fully inserted into the player 100, the condition of the latch arms 130 and 132 is alternated between the extended condition (FIG. 9) and the retracted condition (FIG. 8). The alternating apparatus is disclosed in the copending U.S. patent application, Ser. No. 801,602 of C. A. Elliott, et al. entitled, "PACKAGE ACTUATED RECORD EXTRACTING MECHANISM FOR A VIDEO DISC PLAYER." The Elliott, et al. application is assigned of record to the assignee of the instant application. The function of the record extracting mechanism 128 will be explained in detail subsequently.

The player 100 further includes platform linkage assembly 154 for causing the motion of the platform 118 between the depressed position (FIG. 6) and the elevated position (FIG. 7) in response to motion of the flapper door 102, respectively, between the access denying position (FIG. 6) and the access permitting position (FIG. 7). The platform linkage assembly 154 includes a pair of levers 156 and 158 secured to the door 102 for rotation therewith. The platform linkage assembly 154 further includes a pair of springs 160 and 162 interconnecting the free end of the levers 156 and 158 and the side rails 122 and 124. A pair of stop pins 164 and 166 are mounted to the player housing 108 for ensuring that the platform 118 is raised to a correct height when the flapper door 102 is opened, as a result of the insertion of the record cover into the player 100, in the manner shown in FIG. 7. The springs 160 and 162 allow the flapper door 102 to over-travel when the record cover is fully inserted into the player so that the platform 118 rises to the correct height without the need for precision parts.

A set of spring loaded lifting pads 168-174 are pivotally mounted to the rails 122 and 124 for a purpose which will be described subsequently. A set of wire springs (e.g., 176 and 178) are provided to bias the lifting pads (e.g., 172 and 174) toward a raised position as shown in FIGS. 6 and 7. A set of pins (e.g., 180 and 182) are secured to the rails (e.g., 124) for reception in apertures (e.g., 184 and 186) provided in the lifting pads (e.g., 172 and 174) to accurately locate the top surfaces of the lifting pads relative to the platform 118 (FIGS. 6 and 7). A member 188 (FIG. 5) interconnects the rear lifting pads 170 and 172.

The operation of the player 100 will now be described in conjunction with FIGS. 5-9. When the record cover, carrying a video disc, is inserted into the player 100 through the input slot 106, it lifts the flapper door 102 whereby the platform 118 is caused to rise as shown in FIG. 7. The insertion of the record cover into the player 100 causes the lifting pads 168-174 to retract within the confines of the platform 118, allowing the record cover to arrive at a fully inserted position in the player. As the record cover arrives at the fully inserted position in the player 100, the latch arms 130 and 132 are admitted into the hole 72 of the tray 54 (FIG. 8).

The arrival of the record cover at the fully inserted position in the player 100 causes the latch arms 130 and 132 to change from the retracted condition (FIG. 8) to the extended condition (FIG. 9), thereby locking the tray 54 to the platform 118. As the jacket 52 is withdrawn thereafter (1) the latch arms 130 and 132 retain the tray 54, carrying the video disc 58, in the player and (2) the wire springs (e.g., 176 and 178) cause the lifting pads 168-174 to return to the desired raised position. Thus, the tray 54 and the video disc 58 are retained in the player 100 resting on the lifting pads 168-174 at an appropriate level (i.e., having their center lines aligned with the center lines of the channels 110 and 112) upon a conclusion of jacket withdrawal.

Additionally, jacket withdrawal from the player 100 allows the flapper door 102 to move to the access denying position shown in FIG. 6. Such motion of the flapper door 102 causes the platform 118 to move to the depressed position, as shown in FIG. 6, effecting a transfer of the video disc 58 from the lifting pads 168-174 to the turntable 114 for playback.

When an empty jacket is inserted into the player 100 through the input slot 106 (FIG. 7), the flapper door 102 is opened causing the platform 118 to rise to the elevated position (FIG. 7). as the platform 118 rises, the lifting pads 168-174 lift the tray 54 and the video disc 58 therewith.

When the platform 118 reaches the elevated position (FIG. 7), the lifting pads 168-174 support the tray 54 and the video disc 58 so that their center lines are aligned with the center line of the empty jacket 52, causing the tray and the video disc to return to the jacket during its insertion. The alignment apparatus is described in the copending U.S. patent application, Ser. No. 801,728 of R. DeStephanis entitled, "RECORD SUPPORT AND ALIGNMENT APPARATUS FOR A VIDEO DISC PLAYER." The DeStephanis application is assigned of record to the assignee of the instant application. When the jacket 52 is fully inserted into the player 100, it causes the latch arms 130 and 132 to change from the extended condition (FIG. 9) to the retracted condition (FIG. 8) releasing the tray 54. When the jacket 52 is removed from the player 100, detents (e.g., 84 and 86 in FIG. 4) cause the enclosed tray 54 and the video disc 58 to leave the player.

Thus, it will be seen that the above-described player allows a video disc to be inserted into and removed from the player without its direct handling by the user. A record handling system of this type is described in the copending U.S. patent application, Ser. No. 801,604 of L. A. Torrington and entitled, "RECORD HANDLING SYSTEM FOR A VIDEO DISC PLAYER." The Torrington application is assigned of record to the assignee of the instant application.

In order to play the first side of the disc, for example, the package 50 is inserted into the player such that the side of the spine having indicia "SIDE 1" is facing toward the user. When the jacket 52 is withdrawn after full insertion thereof into the player, the record 58 and the retaining member 54 are caused to remain in the player. The depression of the platform results in deposition of the record on the player turntable with its first side facing the playback stylus. When an empty jacket is inserted into the player after playback, the platform lifts both the record and the retaining member so as to cause their reversion into the jacket. Since the orientation of the record relative to the spine remains constant and since the record side identification is on the spine, identification of the record side does not depend upon orientation of the jacket relative to the spine.

In the U.S. patent application Ser. No. 821,201, of F. X. Conaty, entitled, "VIDEO RECORD PACKAGE," and filed concurrently herewith, a record side identification system is disclosed wherein the record side identifying indicia are secured to a portion of the spine which protrudes beyond the edges of the jacket which define the end access opening therein.

What is claimed is:

1. A packaged record comprising:
   (A) a disc record;
   (B) a jacket having a record enclosing cavity and an end access opening in communication therewith;
   (C) a record retaining spine withdrawably received within said cavity; said spine substantially extending into said end access opening when it is fully inserted into said jacket;

(D) indicia secured to the foremost exposed edge of said spine for associating a first side of said record with a given side of said spine; said record being enclosed within said package such that said first side of said record is on the same side of said cavity as said given side of said spine; and (E) means secured to said spine for limiting relative motion between said spine and said enclosed record.

2. A combination as defined in claim 1 including additional indicia secured to said exposed edge of said spine for associating the other side of said record with the side of said spine opposing said given side.

3. A record and package combination comprising:
(A) a disc record having a first set of information recorded on a first side thereof;
(B) a jacket having a record enclosing cavity and an end access opening in communication therewith;
(C) a record retaining spine withdrawably received within said cavity; said spine substantially extending into said end access opening when it is fully inserted into said jacket;
the opposing sides of said jacket having cutouts through which respective portions of said spine are exposed when said spine is fully inserted into said jacket;
(D) means secured to said spine for limiting relative motion between said spine and an enclosed record; and
(E) indicia secured to one of said exposed portions of said spine for associating said first side of said record with a given side of said spine; said enclosure of said record within said cavity being such that said first side of said record is on the same side of said jacket as said given side of said spine.

4. A combination as defined in claim 3 wherein said record has a second set of information recorded on the side of said record remote from said first side; and wherein additional indicia is secured to the other of said exposed portions of said spine for associating said remote side of said record with the side of said spine opposing said given side.

5. A combination as defined in claim 4 wherein relative dispositions of said cutouts on said opposite sides of said jacket are such that a certain one of said cutouts exposes said one indicia bearing portion of said spine when said spine is retrieved in said jacket with said given side of said spine adjacent to the side of said jacket having said certain one of said cutouts, and such that its exposes said other indicia bearing portion of said spine when said spine is retrieved in said jacket with said opposing side of said spine adjacent to the side of said jacket having said certain one of said cutouts.

6. A combination as defined in claim 5 wherein each of said exposed side portions of said spine is raised; and wherein each of said cutouts is positioned and dimensioned such that whichever one of said raised exposed portions of said spine is aligned therewith is received therein upon retrieval of said spine into said jacket.

7. A combination as defined in claim 6 wherein said jacket is made from opaque material.

8. A protective package for a disc record comprising:
(A) a jacket formed by a pair of juxtaposed panels defining a cavity for enclosing a record; the unjoined peripheral edges of said panels defining an end opening in communication with said record enclosing cavity;
(B) a record retaining member withdrawably received within said cavity; said record retaining member including a spine portion and an annular portion having an opening; said annular portion opening substantially encircling an enclosed record; said spine portion extending into said end opening in said jacket when said record retaining member is fully inserted therein; and
each of said panels having a cutout; through which cutouts respective side portions of said spine being exposed when said spine is fully retrieved within said jacket; at least one of said exposed side portions of said spine bearing indicia for differentiating a side of said spine from the opposed side thereof.

* * * * *